Dec. 13, 1966         W. E. F. LEHMANN         3,291,171
      WHEEL HAVING EXPANDABLE BAND FOR QUICK MOUNTING
                AND DEMOUNTING OF PNEUMATIC TIRES
Filed June 16, 1964                          5 Sheets-Sheet 4
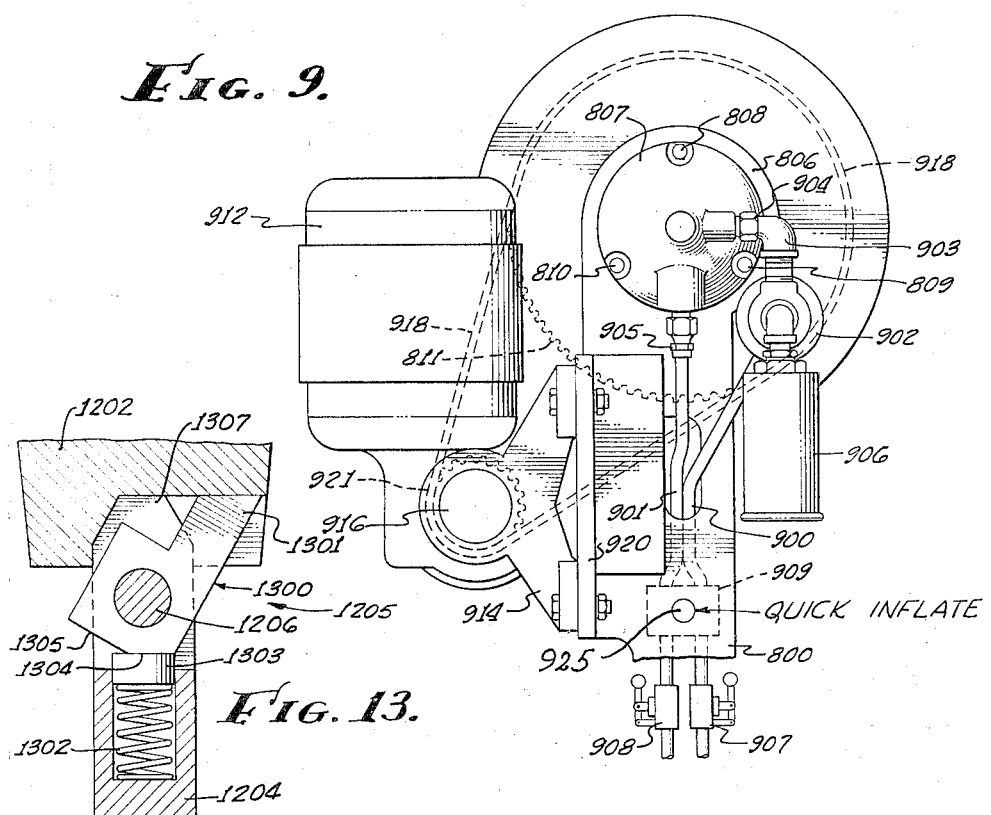
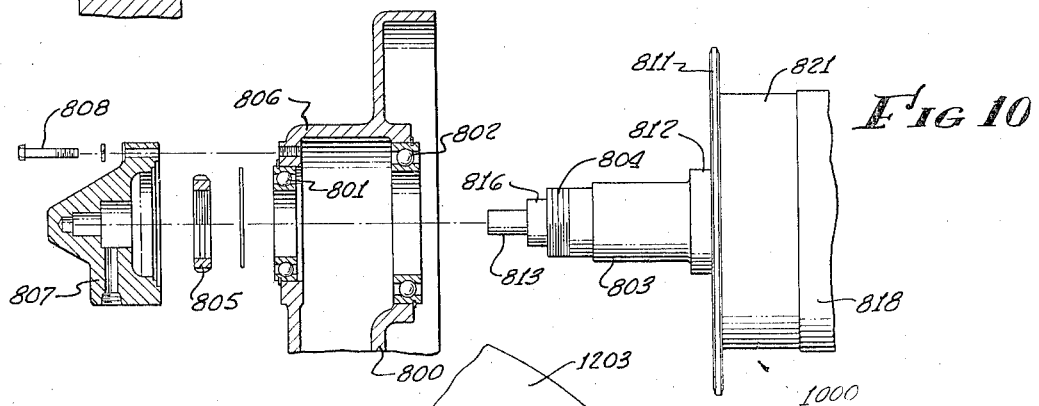
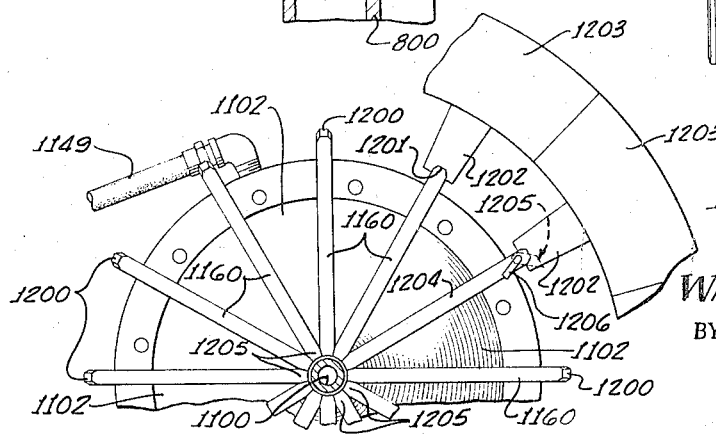
INVENTOR.
WALTHER E. F. LEHMANN
BY
Nicholas T Vohr
ATTORNEY.

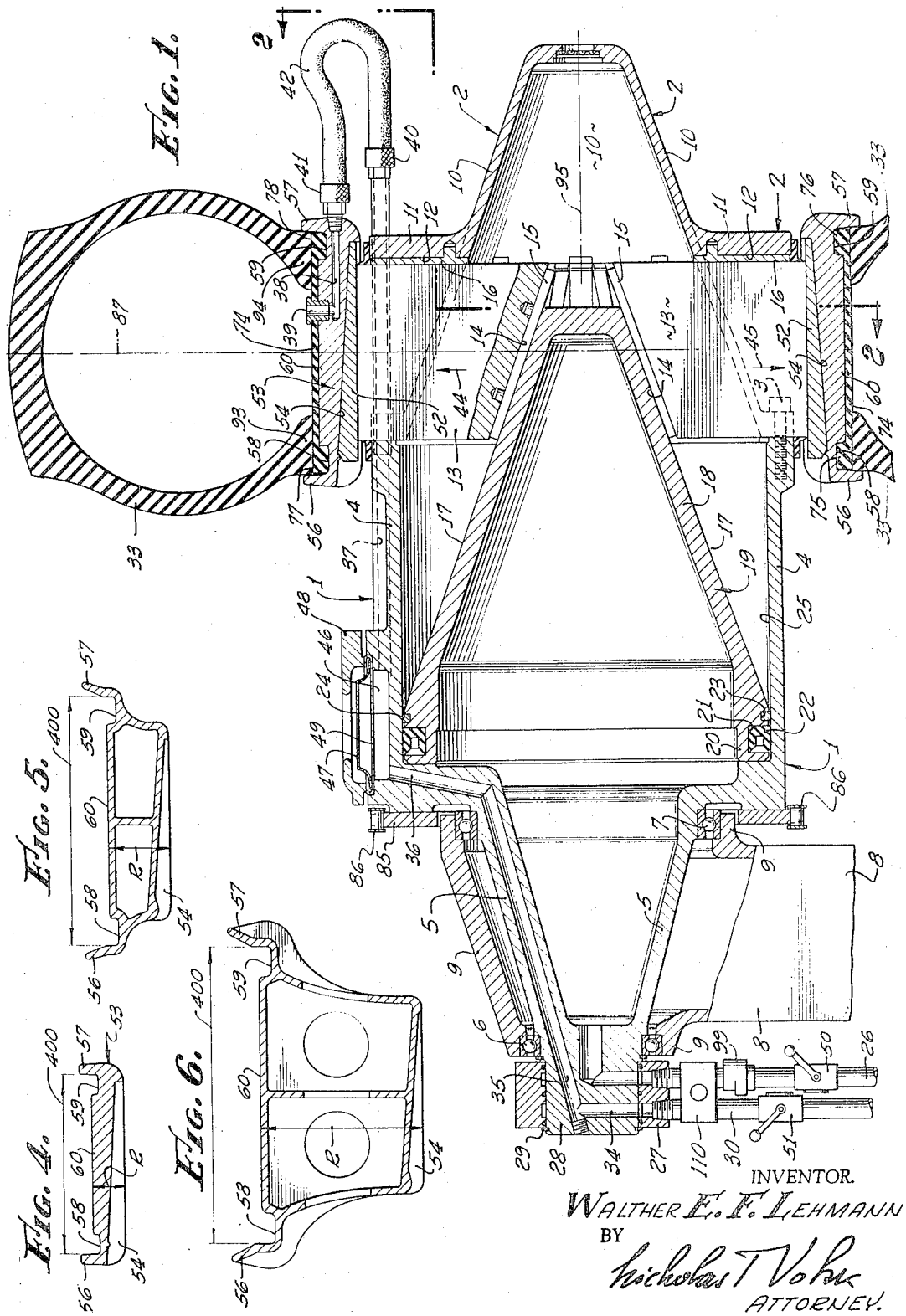

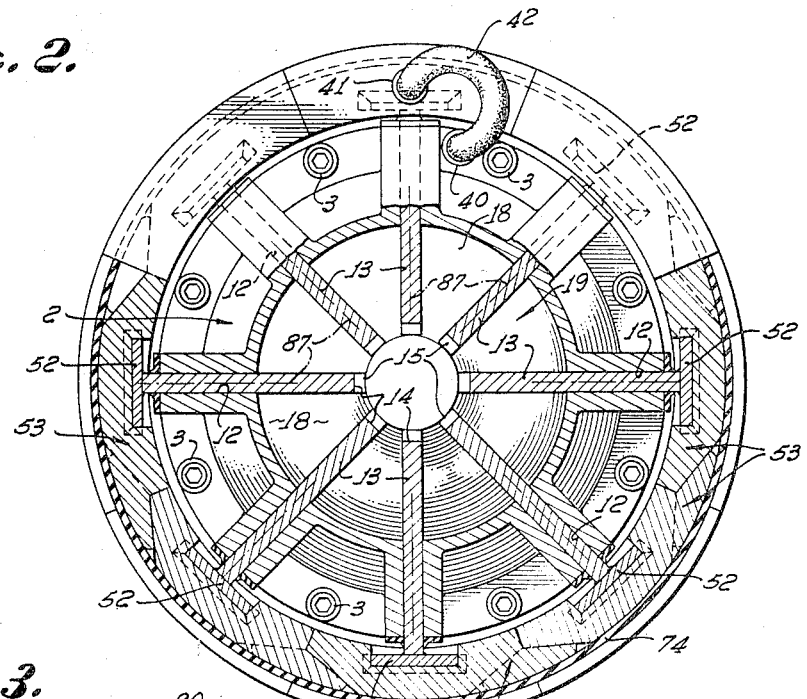
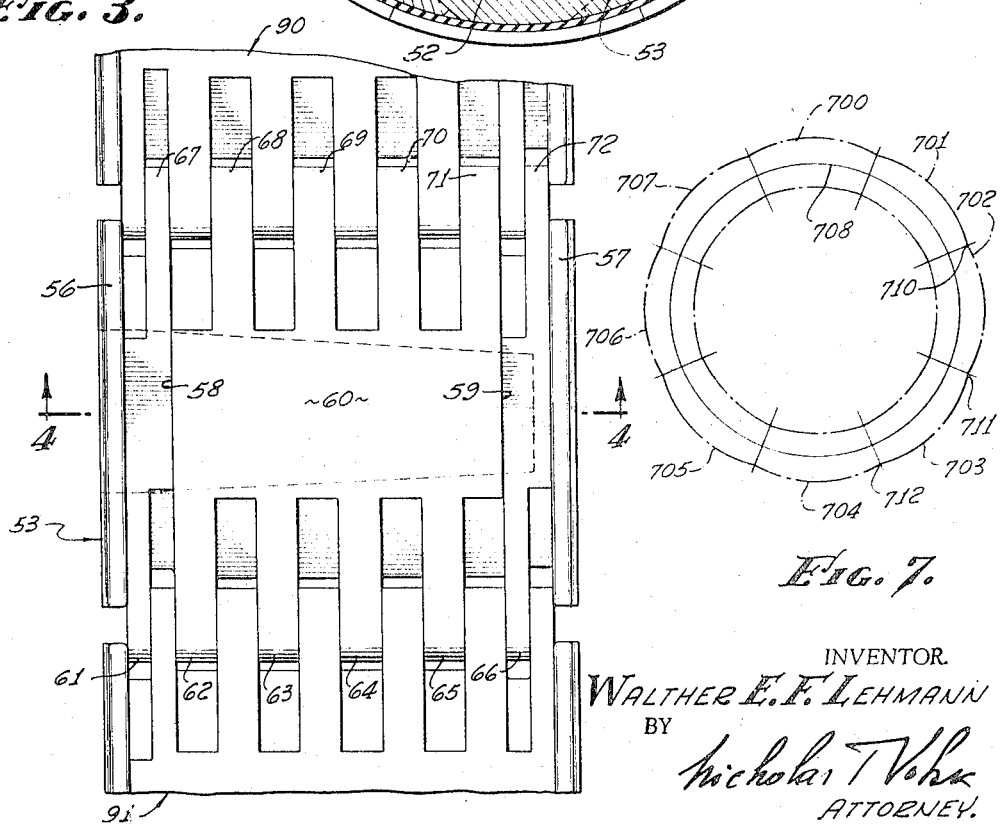

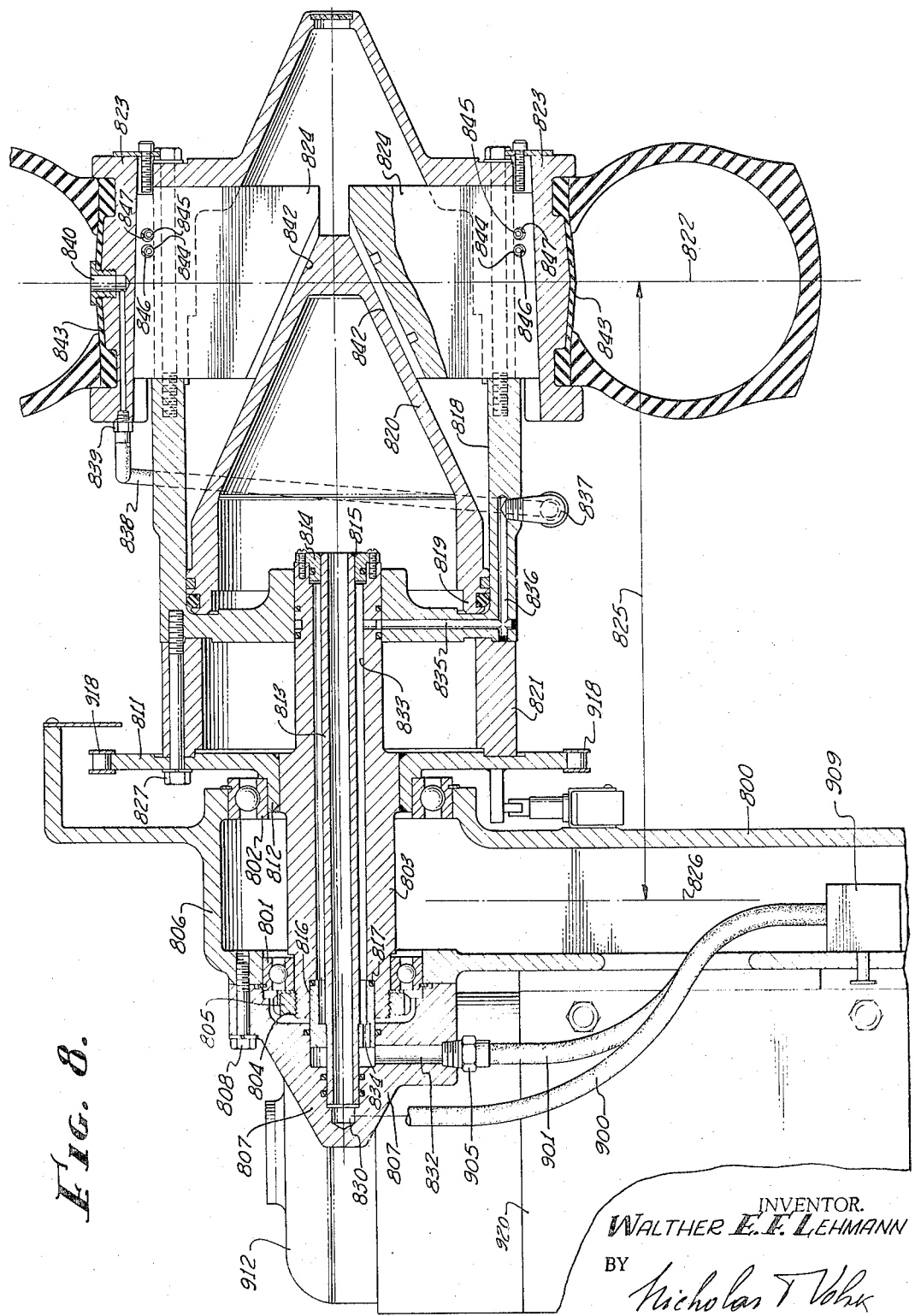

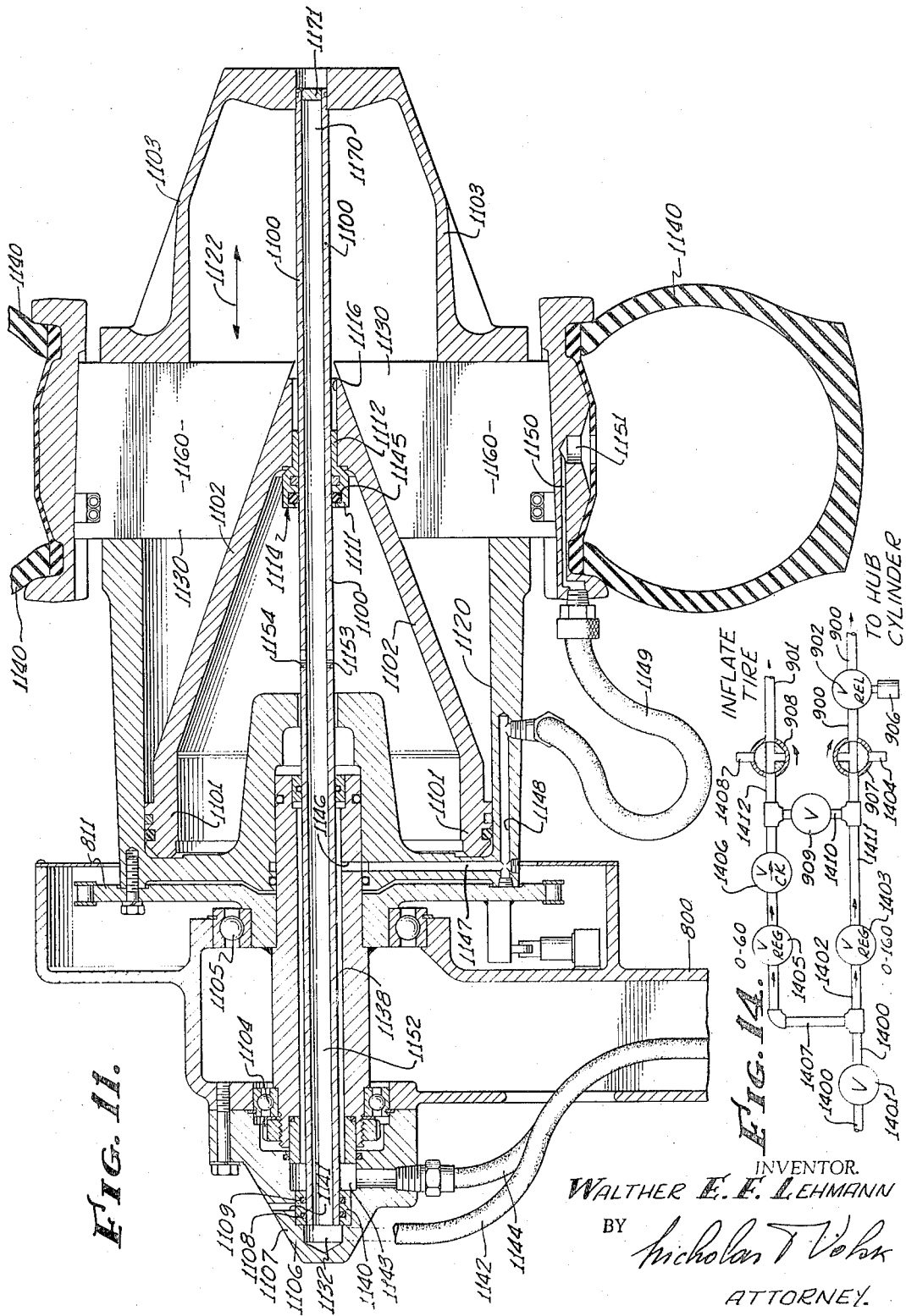

United States Patent Office 3,291,171
Patented Dec. 13, 1966

3,291,171
WHEEL HAVING EXPANDABLE BAND FOR QUICK MOUNTING AND DEMOUNTING OF PNEUMATIC TIRES
Walther E. F. Lehmann, Costa Mesa, Calif., assignor to American Machine & Foundry Company, a corporation of New Jersey
Filed June 16, 1964, Ser. No. 375,591
11 Claims. (Cl. 144—288)

This application for patent is a continuation-in-part application of the earlier application, Serial No. 279,108, filed May 9, 1963, now abandoned, and entitled Wheel Having Expandable Band for Quick Mounting and Demounting of Pneumatic Tires.

This invention relates to wheels having expandable bands or outer peripheries for quick mounting and demounting of pneumatic tires of different sizes on such wheels. Wheels of this type are used in connection with tire retreading machines, tire buffers, and tire inspection machines which detect ply and tread separations, all of the above machines requiring rapid and effortless mounting, inflation, deflation, and demounting of pneumatic tires of different sizes for their treatment on the machines of the above types.

The inner diameter of pneumatic tires, which is also called the bead diameter, varies widely. The bead diameter of passenger tires varies from 10" to 16", and the bead diameter of truck tires varies from 15" to 24". Off-the-road and aircraft tires have even larger diameters.

It is desirable to have in tire shops a wheel with an expandable peripheral band supported by a central rotatable hub provided with a plurality of wheel spokes, the spokes being movable radially in and out for enlarging and decreasing the circumference or the periphery of the band and of the periphery spanned by the sectors which support the expandable elastomeric band surrounding the sectors.

A single, economically feasible hub is not capable of having an expansion range which is capable of accommodating all tires having from 13" to 24" bead diameters. It is possible, however, to use one hub, one set of spokes with the hub and mount on the outer end of such spokes, shoes of different sizes, and then surround these shoes with an elastomeric expandable band of a corresponding diameter. One then obtains an expandable ring composed of a plurality of shoes of a given size surrounded by a rubber band. By mounting shoes of smaller or larger size on the same size hub, it becomes possible to span the first range of from 10" to 13" with the first set of shoes, and the 13" to 16" range with the second, larger set of shoes, by using a small hub. A larger hub then has the following set of shoes: the first set of shoes has the same range from 13" to 16"; the second set has a range from 17" to 20"; the third from 20" to 22"; and the fourth from 22" to 24". This invention discloses such wheel.

Wheels with expandable peripheries or bands of this general type are known to the prior art. Examples of such wheels are found in the U.S. Patents 2,960,130 and 2,937,676 to J. A. Smyser. The wheels of the prior art have limited expansion range, and are not capable to furnish sufficient radial pressure with their spokes for proper mounting and air-tight sealing of large-size tires, such as truck tires, which may have a circumference more than twice as large as the circumference of the smaller passenger tires.

It is, therefore, an object of this invention to provide an expandable wheel apparatus with interchangeable hubs, shoes and bands, the set of shoes and the corresponding band having different ranges of expansion from set to set, so as to accommodate small as well as large diameter tires, and the interchangeable hubs also being large and small hubs for increasing the range of expansion of the wheels still further.

It is an additional object of this invention to provide a wheel of the above type which is capable of exerting high and even pressure around the entire periphery of the tire beads with the aid of a plurality of radially movable shoes, or sectors, having intermeshing fingers, and an elastomeric band surrounding the sectors and the fingers for obtaining positive, leakproof sealing between the tire and the elastomeric band.

It is an additional object of this invention to provide a wheel of the above type in which the main frame of the machine, or the wheel support, is arranged to receive hubs of different sizes, the hubs being provided with radial spokes capable of receiving sets of shoes of different sizes for obtaining wide ranges of expansion of the outer periphery of such wheel.

Still another object of this invention is to provide a wheel including two independent pneumatic circuits, one circuit being for inflating the tire, and the second circuit being for operating a power piston, and still another circuit interconnecting the first two circuits for connecting either a high or low pressure to the tire inflatable circuit of the machine.

It is also an object of this invention to provide a wheel of the above type in which the spokes of the wheel represent radially positioned shoe stems having rectangular cross-sections, these transverse cross-sectional areas of the bars being made sufficiently large so as to support high radial pressure for transmittal of such pressure to the tire beads for proper air-tight sealing of the beads against the peripheral rubber bands.

Referring to the drawings:

FIG. 1 is a vertical, longitudinal section of the wheel with the expandable outer band;

FIG. 2 is a transverse, vertical section of the wheel shown in FIG. 1 taken in a vertical plane passing through line 2—2 shown in FIG. 1;

FIG. 3 is a plan view of the peripheral portion of three shoes, with parts of the two shoes being broken away;

FIGS. 4, 5 and 6 are transverse sections of three types of shoes used with the wheel illustrated in FIG. 1;

FIG. 7 is an explanatory figure illustrating the effect of increasing the number of shoes, or sectors, used in the wheel;

FIGS. 8 and 11 are vertical, longitudinal sections of the second and third versions, respectively, of the expandable wheel;

FIG. 9 is an end view of the wheel illustrated in FIG. 8;

FIG. 10 is an exploded side view of the hub elements, some of the elements being in section;

FIG. 12 is an end view of the wheel hub illustrated in FIGS. 8 and 11;

FIG. 13 is a side view, partly in section, of a band latch locking the band to the hub and hub spokes;

FIG. 14 is the schematic diagram of the pneumatic system and connections used with the disclosed wheels.

Referring to FIGS. 1 and 2, the wheel comprises a composite hollow hub, rotatably mounted in bearings 6 and 7. The hub includes a central hub portion 1, a front hub portion 2, and a rear hub portion 5. The rear and the central hub portions 1 and 5 constitute a single metallic casting, with the rear portion comprising a conically-shaped, closed-off rear extension used for rotatively supporting the entire hub and the entire wheel with the aid of the bearings 6 and 7 on a vertical column 8 having a hub 9 which surrounds the rear portion 5 of the rotatable composite hub of the wheel. The front hub member 2 is connected to the central hub member 1 by means of eight studs 3 seen in FIG. 2. The central portion 1 comprises, in the main, a cylinder 4 which terminates in a circular opening closed off by means of the front hub member 2. The front hub member 2 includes a cone-shaped portion 10, and a cylindrical and disk-shaped portion 11 which is bolted to cylinder 4, in the manner illustrated in FIG. 2, by means of eight studs 3. The cylindrical portion 11 is provided with eight rectangular, radially positioned slots 12, which are used for guiding eight shoe stems 13. Shoe stems 13 have a rectangular cross-section, and form a sliding fit with the rectangular slots 12. Slots 12 are provided with oil or graphite impregnated plates 16 on the load-bearing side of the slots. The shoe stems are provided with inclined flat cam surfaces 14, and load-bearing oil or graphite impregnated plates 15. Plates 15 form a sliding contact with the cone 18. In order to make the structure as compact as possible, the piston portion 20 of the piston member 19 is made quite short, such as from 0.5″ to 1½″; while the cone-shaped portion 18 of the piston member is made in the order of 20″–22″ to obtain as large a range of expansion as possible. The piston portion 20 is stabilized and guided within the cylinder with the aid of rectangular stems 13 which positively guide the entire piston member 19 along with the longitudinal axis 95. The piston portion 20 is provided with a circular groove 21 for mounting a sealing ring 22, and a second circular groove 23 for mounting a felt wiper 24. The sealing ring 22 forms an air-tight joint with the surface 25 of cylinder 4. Cylinder 4 is supplied with compressed air at a pressure which is in the order of 100 pounds per square inch through a pipe 26 connected to a stationary coupling sleeve member 27. Coupling member 27 forms a rotatable joint with the rotatable cylindrical portion 28 of the rear portion of the hub. The stationary coupling member 27 is held in place with a ring 29. A second pipe 30 is connected to the coupling member 27 which supplies compressed air at a tire inflation pressure which is in the order of 15–25 pounds per square inch. The tire inflation air is conveyed to a tire 33 through ducts 34, 35, 36, 37, 38 and 39, couplings 40 and 41, and a flexible hose 42. The tire inflating circuit is provided with a chamber 46 and a frangible disc 47 held in place by a cover 48, and sealed by a flexible diaphragm 49 to the hub member. Compressed air enters cylinder 4 through the hollow cone 5, making piston 20 and cone 18 travel from left to right as viewed in FIG. 1. As piston member 19 travels from left to right, it pushes outwardly the rectangular shoe stems 13 in the radial directions indicated by arrows 44 and 45. Two three-way valves 50 and 51 are used for introducing and releasing air pressure to and from the cylinder and the casing. Line 26 also includes a valve 110 and a quick exhaust valve 99. Valve 99 provides immediate passage to the atmosphere from cylinder 1 after three-way valve 50 is shut off, and connects the one side of the quick-exhaust valve to the atmosphere. Valve 110 connects duct 30 to duct 26 for introducing high pressure into duct 30 for quick inflation of tire 33.

The shoe stems 13 terminate in rectangular outer ends and double wedges welded to the outer ends of the stems. The wedges 52 are wedge-shaped in two planes at right angles to each other. A shoe 53 is mounted on top of each shoe stem 13 in the manner illustrated in FIGS. 1 and 2. Shoe 53 is provided with a matching, or complementary, wedge-shaped recess, or seat 54 which forms a tight fit with wedge 52 after shoe 53 is slid over wedge 52 to its extreme left position as viewed in FIG. 1. The longitudinal axes of the wedges 52 and of the seats 54 are parallel to axis 95. Shoe 53, therefore, can be mounted on and demounted from stem 13, and a shoe of different size, larger or smaller, mounted on stem 13 for mounting a smaller or larger diameter tire on the wheel, and for changing the range of expansion of the wheel. All shoes are provided with side rims 56 and 57, recesses 58 and 59, central arcuate portion 60, and fingers 61–66 and 67–72. The fingers of each shoe intermesh with the corresponding fingers of adjacent shoes 90 and 91 in the manner illustrated in FIG. 3. These fingers furnish a continuous solid support for an elastomeric band 74 which surrounds the shoes when the shoes travel outward and a gap is formed between the solid portions of the shoes. The gap is bridged by the fingers. Band 74 is provided with two integral end rings 75 and 76 which fit into arcuate recesses 58 and 59 of the shoes 53, and in this manner prevent band 74 and its two edges from sliding inwardly, toward the center line 87 when the wheel and the band begin to expand and the band, because of its stretching, has a tendency to assume the shape having a progressively smaller width. The two circumferential edge portions 77 and 78 of the band form an air-tight joint with the two beads 93 and 94 of the tire 33 after the band has been expanded to the point at which the edges 77 and 78 tightly engage the two beads. The inflation of the tire is started after the band 78 is almot fully expanded so that the final stages of the expansion of the band and the inflation of the tire proceed simultaneously, and in this manner the tire becomes properly seated on the band with the two beads 73 and 74 engaging the two side rim sectors 56 and 57 even before the band is fully expanded and before the tire is fully inflated.

The hub is provided with a sprocket wheel 85 which is connected to a driving sprocket by a chain 86 and an electric motor which rotates the wheel around its rotational axis 95. Sprocket wheel 85 is fastened to the central portion 4 of the hub.

FIGURES 4, 5 and 6 illustrate three transverse sections of different size shoes mountable on the shoe stems 13.

In order to accommodate a large range of tire sizes, it becomes necessary to provide different size shoes. The construction of the shoe stems and individual shoes is such that it is impossible to span the entire range, from 13″ to 24″, by merely moving outwardly the eight shoes constituting the outer periphery of the wheel. The limit of expansion is imposed by a plurality of factors, the main factor being the size of the piston-cone member, its length, the maximum angle of the cone, and the maximum outward pressure, or thrust, which can be exerted by the piston and the cone. In order to enlarge this range of expansion, a plurality of hubs are provided which can be mounted on column 8. The hub in FIG. 1 cannot be interchanged conveniently in FIG. 1, but it can be in FIGS. 8 and 11. Also, shoes of different sizes and dimensions are provided for all wheels, FIGS. 1, 8 and 11, three samples of such shoes being illustrated in FIGS. 4, 5 and 6. One dimension that must be made larger from one set to the next is dimension 400 which is a bead-to-bead dimension. In FIG. 4 this dimension is in the order of 4½″; in FIG. 5, it is in the order of 6½″; and in FIG. 6, it is in the order of 7″; and there is an additional, larger shoe, not shown, where this dimension is 8″. Although only three shoes are illustrated, it should be noted here that in order to embrace the entire range of permutations which are necessary in order to mount any and all types of tires, with the exception of the off-the-road tires, up to six different shoe sizes, and two different hubs, will be required; these combinations being obtained by combining various bead-to-bead dimensions with various bead diameter dimensions.

When shoes of this type assume minimum diameter, which takes place when piston 19 is withdrawn to its extreme left position, as viewed in FIG. 1, with the result that the shoe stems 13 assume their innermost inward position, then all of the shoes can be removed as a single ring from the shoe stems, and these shoes then support each other in a circular band because of the inward pressure upon them produced by the rubber band 74, and also because of the intermeshing between fingers 67–72 and 61–66 shown in FIG. 3. Similarly, the entire shoe ring can be thus mounted and demounted from the stems in one single operation because of its ability to support itself in the above manner. The sectors and the fingers 61–66 and 67–72 interlock each other and act as a selfsupporting circular band composed of a plurality of keystones held together by the rubber band. In view of this configuration of the shoes and of the band, it becomes especially desirable to have the double-wedge configuration for the wedges 52 in the mounting area, since it becomes especially convenient to mount such ring over the shoe stems and the wedges without precise centering and precise positioning of such shoe ring with respect to the wedges 52. It is only necessary to engage the tips of the wedges with the wide wedge seats 54 provided in the stems, whereupon wedges 52 act as guides.

FIG. 7 illustrates the pattern produced by eight segments 700 through 707 when they are in the mid-position, at which time they form a perfect circle 708, and then when they are in the extreme outward position, where they begin to look like scallops joining each other at such points as 710, 711, 712, etc. The same scalloping is also present in the innermost position of the segments, as shown in FIG. 7. From this figure, it follows that a smoother circumference will be obtained in the extreme inward and outward positions of the shoes if the number of shoes used is made as large as possible. It has been found that twelve shoes produce satisfactory operation of the wheel within the indicated ranges. Therefore, although FIGS. 1 and 2 illustrate eight shoes, the preferred arrangement is the one which uses twelve shoes, which is illustrated in FIG. 12. Thus, the scalloping effect is minimized by making the perfect circle appear at the mid-point of the expansion range, and also by making the rubber band 74 of sufficient thickness. Rubber bands from 5/16" to 5/8" thick eliminate this scalloping effect in the bead area very well, with the result that there is no leakage of air from the tire.

FIGS. 8 through 10 illustrate an additional version of the expandable wheel, which, as mentioned previously, is especially adapted for mounting different size hubs on the wheel supporting column 800. In order to achieve this interchangeability, the wheel supporting column 800 is provided with two bearings 801 and 802 which support a sleeve 803 which can be slid lengthwise in and out of the bearings in the manner described below. Bearing 801 engages a rotatable sleeve 803 which has a threaded outer end 804. A nut 805 is used for holding sleeve 803 in fixed position with respect to hub 806 which houses the two bearings 801 and 802. It is this nut 805 that holds the entire rotatable wheel assembly in fixed relationship with respect to hub 806, and, when nut 805 is unscrewed from sleeve 803, then the entire wheel assembly can be slid laterally out of hub 806 and a new wheel, either of smaller or larger dimension, inserted into the hub 806, whereupon nut 805 is screwed on the inner end 804 of sleeve 803, thus mounting the entire wheel assembly in the hub. In order to gain access to nut 805, it is necessary first to remove an end cap 807, which is bolted to hub 806 by means of three studs 808, 809, and 810, FIG. 9. Upon the removal of cap 807, nut 805 becomes fully exposed, and then it can be unscrewed from the threaded end 804, and the entire wheel assembly removed by sliding, lengthwise and to the right, as viewed in FIG. 8, sleeve 803 out of bearings 801 and 802. Sleeve 803 forms a press fit with a sprocket wheel 811, the collar or the hub 812 of the sprocket wheel forming a sliding fit with the inner roller of bearing 802. Therefore, when the wheel assembly is removed from hub 806, the sprocket wheel 811 remains on sleeve 803, and is removed from hub 806 together with the sleeve and the wheel as illustrated in FIG. 10. Sleeve 803 is concentrically mounted on a tube 813 with the aid of an end cap 814 which is welded to tube 813 at 815, and a second end cap 816, which is pressed onto tube 813, and is provided with an O-ring 817 for making an air-tight joint with sleeve 803. Tube 813 is preferably made of stainless steel to prevent corrosion, since compressed air, at times, has considerable moisture in it, which is apt to condense and deposit moisture in tube 813 and cylinder 818. A piston 819 and a cone 820 form a single-piece element, corresponding to the same type of element used in FIG. 1. Also, as in FIG. 1, either eight, and preferably twelve, spokes 824 engage the cone-shaped outer surface of cone 820 and slanted surface 842 which support shoes 823 of the type described previously. As in the case of the earlier version of the wheel, spokes 824 are moved outwardly and press shoes 823 and the rubber band 843 into expanded position when high pressure air is introduced into cylinder 818. When valve 902 is opened and high pressure is released from cylinder 818, shoes 824 press inwardly on the cone member 820 and, in this manner, slide cone 820 from its right position in cylinder 818 to its left position in cylinder 818. The forces that act on the shoes 823 at this time are due to the force exerted on the spokes 824 by the rubber band 843 and also by coil, or helical, springs 844 and 845, which surround all of the spokes 824 by passing through the openings 846 and 847 provided for this purpose in the spokes. A hollow ring metallic spacer 821 is interposed between cylinder 818 and sprocket wheel 811 in order to place the center lines 822 of the shoes 823 and of the spokes 824 at the proper, desired distance 825 from the center line 826 of column 800. Wheels of this type are used on such machines as buffers, tire failure detectors or ply-separation detectors, the so-called "Orbitread" ribbon-winding machines, which apply variable thickness elastomeric layers to new or old tire casings, etc. In all of these machines, the center line 822 of the shoes and, therefore, of the tire casing must be in line with the center line of the entire machine, and spacer 821 enables one to accomplish this proper centering of the wheel with respect to the entire machine, and, therefore, also with respect to the center line in the vertical axis 826 of column 800. For different wheels, spacer 821 may have different dimensions, and for wheels of large size such as, for example, those capable of reaching a maximum diameter in the order of, say, 15" to 24", spacer 821 is not used at all because cylinder 818, and the piston cone member 819-820 become so long that they become fastened directly to the sprocket wheel 811 without any spacer 821, as illustrated in FIG. 8. Studs 827 are used for connecting cylinder 818 to sprocket wheel 811 in both cases, except that the length of the studs is different in two cases.

High and low pressure compressed air is supplied by flexible tubes 900 and 901, FIG. 9. Tube 900 is connected to a quick exhaust valve 902, and then to an elbow 903, and a connector 904, which connects high-pressure hose 900 to the cap 807. The low-pressure hose 901 is connected directly to cap 807 by means of a connector 905. The high-pressure circuit is also provided with an exhaust muffler 906. The high and low pressure hoses 900 and 901 are connected to the manually controlled valves 907 and 908, and a push button valve 909 interconnecting the two hoses, for introducing high pressure into the low-pressure line 901 for fast inflation of tire casings in the manner described previously. The high pressure reaches cylinder 818 through the central tube 813, and a duct 830, which is connected directly to connector 904. The low pressure reaches the tire casing through ducts 832 and 833, a plurality of openings 834 in cap 816, ducts 835 and 836 in an elbow connector 837, a hose 838, a connector 839, and an opening 840 in the rubber band 843 surrounding shoes 823. The pneumatic system of the wheel will be described more in detail in connection with the description of FIG. 14.

The expandable wheel is rotated by means of a motor 912 which is mounted on column 800 by means of a bracket 914, and an adjustable and rotatable pin 916 mounted in bracket 914, which adjusts the tension of a chain 918. Chain 918 interconnects the sprocket wheels 811 and 921. A T-shaped plate 920 is provided on column 800 for mounting bracket 914 on column 800.

FIG. 10 illustrates the main component parts of the type of wheel illustrated in FIG. 8 when they are separated from each other in the manner described previously. As in FIG. 8, it includes the cap 807, the column 800, the nut 805, and the wheel 1000 which corresponds to the removable wheel illustrated in FIG. 8. In FIG. 10 the three main parts 807, 800, and 1000 are illustrated in their respective positions when wheel 1000 is removed from column 800 and bearings 801 and 802.

FIGS. 11 and 12 disclose still another version of the wheel. The only difference which exists between the wheel disclosed in FIG. 11 and FIG. 8 resides in the fact that a tube 1100 has been introduced into the hub of the wheel, and the number of spokes has been increased to twelve as illustrated in FIG. 12. Tube 1100 acts as an additional guide for piston 1101 and cone 1102. Tube 1100 rotates together with wheel 1103 mounted in bearings 1104 and 1105. The outer end 1106 of tube 1100 revolves in a ring 1140 pressed into cap 1107, and it is sealed to ring 1140 by means of two O-rings 1108 and 1109. Cap 1107 is provided with a vent 1141 which acts as a safety vent preventing high pressure from a chamber 1132 and a high-pressure hose 1142 from entering a low-pressure chamber 1143 connected to a low-pressure hose 1144. A sliding seal bearing 1114, having a collar 1111 and a sleeve 1112, forms a press fit with a bore 1116 in cone 1102. Collar 1111 and sleeve 1112 which constitute a single integral part, therefore, slide back and forth along tube 1100 when piston-cone combination 1101–1102 slide back and forth in cylinder 1120. Bearing 1114 is also provided with an O-ring 1145. Bearing 1114, therefore, is provided for reducing the friction between tube 1100 and cone 1102 when cone 1102 and piston 1101 slide back and forth in the direction of an arrow 1122, i.e., the longitudinal travel of the piston and of the cone along tube 1100, rather than for the rotation of the piston and of the cone around tube 1100.

Experience has shown that very smooth, continuous operation and travel of the piston-cone member 1101–1102 and of the remaining movable parts of the wheel 1103 is obtainable even when the central guide tube 1100 is eliminated altogether, as is the case in the versions of the wheel illustrated in FIGS. 1 and 8. When hub 1103 is of an especially large size, and piston 1101 is extremely narrow, i.e., the axial length of part 1101 is especially small, then an additional centering guide in the form of tube 1100 may be included for insuring proper alignment of the piston within the cylinder during its travels.

Inflation of the tire in FIG. 11 is obtained by introducing low-pressure air through hose 1144, chamber 1143, ducts 1138, 1146, 1147, 1148, a hose 1149, a duct 1150 and an orifice 1151. High pressure is furnished by hose 1142, chamber 1132, duct 1152 and orifices 1153 and 1154. As in the earlier cases, high pressure can also be introduced into ducts 1138, 1147, 1148, etc., for fast inflation of casing 1140, in the manner described previously.

An additional improvement and simplification that is present in FIG. 11 resides in the fact that shoe stems 1160 have been simplified by eliminating such elements as friction-reducing plates 15 and 16 used in FIGS. 1 and 8. This has been made possible by using a synthetic resin material known in trade by its trade-marked name "Nylatron" which is a molybdenum disulphide filled nylon (composition and use for machine parts are covered by United States Patent No. 2,855,377) designed to improve the mechanical and thermal properties of nylon while maintaining its basic electrical and chemical characteristics.

This material has a low coefficient of friction and high strength so as to be suitable for the shoe stems.

Additional simplification of construction and use resides in the elimination of wedges 52, FIGS. 1 and 8 welded to the outer ends of the shoe stems 13. Instead, the shoe stems 1160 terminated in beveled ends 1200, FIG. 12, which form a sliding fit with mating slots 1201 provided at the inner ends of ribs 1202 of the shoes 1203.

Two or more stems, such as a stem 1204, are provided with locking latches 1205 for locking the shoes in place on the shoe stems 1160. The latch includes a handle 1206 fixed to a latch 1300, FIG. 13, provided with a latch arm 1301 which can be placed into a locking position illustrated in FIGS. 13 and 12 by rotating latch 1300 in a counterclockwise direction. The latch is also provided with a spring 1302 and a block 1303 which engages either a flat surface 1304 or a flat surface 1305 on latch 1300, and in this manner holds it in a positive manner either in a locked or unlocked position. An appropriate slot 1307 is provided in a shoe 1203 for locking it to the mating stem 1204.

The shoes and the shoe stems are illustrated in their extreme completely contracted position at which time the inner ends 1205 of the stems 1160 are touching each other on adjacent sides. These inner ends, and the adjacent sides are slightly beveled to allow them to maintain contact with the cone-shaped member 1102 even when the stems are in the fully contracted position. The outer end 1170 of tube 1100, FIG. 11, is closed off by means of a welded in plug 1171 to prevent escape of high pressure air through end 1170 of the tube.

FIG. 14 is the schematic diagram of the pneumatic system used in connection with all the wheels described previously. A high-pressure source of compressed air is connected to a pipe 1400. This source may have a pressure in the order of 150–200 pounds. A shut-off valve 1401 is connected in series with pipe 1400. Two branches are connected to pipe 1400. One branch is a high-pressure branch 1402 which includes a pressure regulator 1403, the three-way valve 907 also shown in FIG. 9, duct 900, the quick disconnect exhaust valve 902, the muffler 906 and the duct 901, all of these elements being also shown in FIGS. 9 and 8. This is the circuit which supplies compressed air to the cylinder for operating the piston and the stems for expanding the band. Regulator 1403 is set for a pressure in the order of 100 pounds for passenger tires and a pressure of 120 pounds for truck tires. The quick disconnect exhaust valve such as Schrader #3340 (A. Schrader's Son, Division of Scoville) sheets of muffler 906 when the three-way valve 907 (such as Schrader #823H) is placed into the position so as to supply compressed air from pipe 1400 to duct 901, and in this manner compressed air is used to expand the wheel. In order to contract the wheel, the three-way valve 907 is placed into the position so as to discharge air from the cylinder and duct 901 into ambient air through the ambient air outlet 1404 of the three-way valve. This at once reduces the pressure in duct 900, and on the upstream side of the quick disconnect exhaust valve 902 which shuts off duct 900 from duct 901 and connects duct 901 to muffler 906. Compressed air in the cylinder then is discharged through muffler 906.

The second circuit connected to duct 1400 is the low-pressure circuit used for supplying air for inflating tires. It includes a duct 1407, a regulator 1405 which has a pressure range from 0 to 60 pounds, a check valve 1406, the three-way valve 908, identical to valve 907, with an ambient air outlet 1408, and the outgoing duct 901 connected to chamber 1143 in FIG. 11 and duct 832 in FIG. 8. Regulator 1405 may be set as low as 10 pounds for passenger tires and 25–30 pounds for truck tires. In order to inflate the tire, valve 908 is operated after the band has been sufficiently expanded so as to engage the two beads of the tire and thus prevent escape of air from the tire. Inflation of the tire snaps it into place and against rims 56 and 57, FIG. 1, thus seating the tire, whereupon the inflation is completed to the desired pressure.

When large-size tires are used it may be helpful, to save time, to use a quick inflation valve 909 connected in series with a duct 1410 which interconnects the high-pressure duct 1411 with the low-pressure duct 1412.

By depressing a push button 925 on the quick-inflation valve 909, high-pressure air is connected directly to duct 901 through the three-way valve 908 and in this manner the tire is supplied the initial burst of air for partially filling the tire. The final inflation is completed by the low-pressure circuit through regulator 1405 which controls the maximum inflation pressure.

The independence of the high and low pressure circuits enables the operator to achieve quick expansion of the band and subsequent inflation and final proper seating of the tire in the most effective manner and in the shortest period of time.

What I claim as new is:

1. A wheel having a radially expandable ring for mounting pneumatic tires and tire casings of different sizes on said wheel, said wheel having a wheel hub, said wheel hub including rear, middle and front portions, said middle portion comprising a cylinder, said front portion including a plurality of radial slots having a rectangular cross-section, said slots being uniformly distributed around the circumference of said front portion, a piston member mounted in said cylinder, said piston member having a piston portion at one end and a front conical portion extending from said piston portion to the other end of said piston member, said conical portion extending through the greater length of said cylinder and projecting into said front portion through a portion of the lengths of said slots when said piston is in the inward position in said cylinder and adjacent to said rear portion of said hub, the lengths of said slots lying in respective radial planes passing through the longitudinal axis of said wheel, a shoe stem slidingly mounted in each slot, the inner end of said stem terminating in an inclined surface slidingly engaging the conical portion of said piston member, two slide surfaces at the outer end of said stem, and a shoe having a seat engaging said two slide surfaces when said shoe is mounted on said stem, said shoes forming a variable diameter circumference of said wheel and said expandable ring, the lengths and the longitudinal axes of said surfaces, seats and of said shoes lying in said respective radial planes, and an elastomeric band surrounding said shoes and keeping said stems in positive engagement with the conical portion of said piston member.

2. The wheel as defined in claim 1 in which said shoe includes an arcuate sector, a plurality of fingers at each peripheral end of said sector, the fingers of one sector intermeshing the fingers of adjacent sector, said sectors and said fingers constituting a continuous, variable diameter circumferential ring of said wheel surrounded by said elastomeric band, said ring being mountable on and demountable from said stems by sliding said ring on and off said stems with the aid of said two slide surfaces and said seats.

3. A wheel having a radially expandable ring for mounting pneumatic tires and tire casings of different sizes on said wheel, said wheel having a wheel hub, said wheel hub including rear, middle and front portions, said middle portion comprising a cylinder, said front portion including a plurality of radial slots having a rectangular cross-section, said slots being uniformly distributed around the circumference of said front portion, a piston member mounted in said cylinder, said piston member having a piston portion at one end and a front conical portion extending from said piston portion to the other end of said piston member, said conical portion extending through the greater length of said cylinder and projecting into said front portion through a portion of the lengths of said slots when said piston is in the inward position in said cylinder and adjacent to said rear portion of said hub, the lengths of said slots lying in respective radial planes passing through the longitudinal axis of said wheel, a shoe stem slidingly mounted in each slot, the inner end of said stem terminating in an inclined surface slidingly engaging the conical portion of said piston member, two slide surfaces at the outer end of said stem, and a shoe having a seat engaging said two slide surfaces when said shoe is mounted on said stem, said shoes forming a variable diameter circumference of said wheel and said expandable ring, the lengths and the longitudinal axes of said surfaces, seats and of said shoes lying in said respective radial planes, an elastomeric band surrounding said shoes and keeping said stems in positive engagement with the conical portion of said piston member and a pneumatic system for operating said wheel, said system including a high pressure source of compressed air, a first circuit connected to said source including a first regulator, a first three-way valve, a quick disconnect exhaust valve and first duct means connecting said exhaust valve to said cylinder, a second circuit connected to said high pressure source including a second pressure regulator, a second three-way valve, an orifice in said band, and second duct means, interconnecting said second three-way valve and said orifice.

4. The wheel as defined in claim 3 which also includes a check valve connected between and in series with said second regulator and said second three-way valve, a third duct means interconnecting the downstream side of said first regulator with the downstream side of said check valve, and quick-operating valve means in series with said third duct means.

5. The wheel as defined in claim 3 which also includes a muffler connected to said quick disconnect exhaust valve.

6. An expandable wheel for quick mounting and demounting of pneumatic tires including a plurality of sector-shaped shoes having left and right side rims for engaging the corresponding outer side portions of tire beads, left and right arcuate countersunk grooves directly adjacent to the inner sides of said left and right side rims, respectively, a central arcuate surface between said left and right grooves, circumferentially projecting fingers at both peripheral ends of said shoes, the fingers of one shoe intermeshing the fingers of adjacent shoes at both peripheral ends of each shoe, fastening means provided on the inner side of each shoe for quick mounting of all of said shoes on and for demounting said shoes from said wheel, and an elastomeric band surrounding all of said shoes, said elastomeric band having first and second inwardly projecting rings filling and resting in said left and right grooves, respectively, said band normally holding all of said shoes, in closed engagement with each other, whereby said shoes form a continuous ring which is mountable and demountable as a unit on said wheel.

7. A wheel having an expandable outer band for quick mounting and demounting of pneumatic tires on said band, said wheel comprising a piston member having a cone-shaped front portion converging to a front end and diverging in the opposite direction into a cylindrical portion constituting a piston portion of said piston member, a hub member surrounding said piston member and having a cylinder portion for said piston portion of the piston member, a plurality of radially positioned slots in said hub member, shoe stems slidingly mounted in said slots, the inner ends of said shoe stems forming sliding engagements with said slots, said shoe stems acting as radially movable spokes of said wheel, a shoe mounted at the outer end of each shoe stem, said shoes and said stems having means for laterally sliding said shoes on and off the outer ends of said stems, and an elastomeric band surrounding all of said shoes.

8. The wheel as defined in claim 7 in which said means includes a wedge mounted at the outer end of said stem and a wedge seat in said shoe; the longitudinal axes of said wedge and said wedge seat being parallel to the longitudinal axis of said wheel.

9. The hub as defined in claim 7 in which said shoe has a plurality of fingers projecting from each peripheral end of said shoe to intermesh adjacent fingers of adjacent shoes along the outer periphery of said wheel.

10. A wheel for quick mounting and demounting of pneumatic tires, said wheel comprising a hollow hub including a cylindrical portion, a piston member mounted within said hub, said piston member including a piston portion and a cone-shaped portion, a plurality of stems having rectangular cross-section, and inner and outer ends, said stems passing through and the inner ends of said stems forming a sliding engagement with the cone-shaped portion of said piston member, shoes mounted at the outer ends of said stems, means for quick mounting and demounting of all of said shoes as a single unit from all of said stems, each of said shoes having first and second bead-engaging flanges, an expandable elastomeric band surrounding said shoes and having a width substantially equal to the inner dimension between said first and second flanges, said elastomeric band and said shoes having means for maintaining substantially constant said width when said shoes are made to travel radially away from said hub.

11. An apparatus for quick mounting and demounting of tire casing, said apparatus comprising a stationary upright column, a column hub at the upper end of said column, a stationary end cap connected to one side of said column hub, a hollow rotatable shaft passing through and rotatably supported by said column hub, one end of said shaft forming an air-tight rotary seal with said end cap, a wheel hub connected to and rotatable with said shaft, a plurality of shoe stems slidably mounted in said wheel hub, pneumatically operated means for moving said stems in and out of said wheel hub, a shoe slidably mounted at the outer end of each stem, an elastomeric band surrounding all of said shoes, and first and second pneumatic circuits connected to said end cap, and first and second circuits including means for operating said first and second circuits independent of each other, said means for operating said circuits including a regulator and a three-way valve serially connected with each of said circuits, first series of ducts for conveying compressed air from said first circuit through said end cap, said shaft, said wheel hub, one of said shoes to said band, and an orifice at said band for conveying compressed air from said first circuit to a tire mounted on said shoes and said band, and a second series of ducts for conveying compressed air from said second circuit to said pneumatically-operated means.

References Cited by the Examiner
UNITED STATES PATENTS

| | | | |
|---|---|---|---|
| 1,058,669 | 4/1913 | Goddard | 72—393 |
| 2,269,137 | 11/1942 | Wikle | 157—13 |
| 2,934,114 | 4/1960 | Robertson. | |
| 2,960,130 | 11/1960 | Smyser. | |
| 3,127,916 | 4/1964 | Robertson. | |

WILLIAM W. DYER, Jr., *Primary Examiner.*

R. J. ZLOTNIK, *Assistant Examiner.*